US008696273B1

(12) United States Patent
Kanczuzewski et al.

(10) Patent No.: US 8,696,273 B1
(45) Date of Patent: Apr. 15, 2014

(54) DEVICE AND METHOD FOR RESTRAINING CARGO

(71) Applicant: Logistick, Inc., South Bend, IN (US)

(72) Inventors: Nicholas Kanczuzewski, Mishawaka, IN (US); John E. Townsend, Paw Paw, MI (US)

(73) Assignee: Logistick, Inc., South Bend, IN (US)

( * ) Notice: Subject to any disclaimer, the term of this patent is extended or adjusted under 35 U.S.C. 154(b) by 0 days.

(21) Appl. No.: 13/740,852

(22) Filed: Jan. 14, 2013

(51) Int. Cl.
B60P 7/08 (2006.01)

(52) U.S. Cl.
USPC .............................. 410/106; 410/97; 410/117

(58) Field of Classification Search
USPC ............. 410/96, 97, 100, 117, 118, 106, 110, 410/116; 24/115 K, 265 CD; 248/499
See application file for complete search history.

(56) References Cited

U.S. PATENT DOCUMENTS

| 969,002 | A | 8/1910 | Teachout |
| 1,401,419 | A | 12/1921 | Mcnally |
| 1,951,660 | A | 3/1934 | Klaudt |
| 2,414,160 | A | 1/1947 | Moon |
| 2,464,080 | A | 3/1949 | Hankins |
| 2,467,681 | A | 4/1949 | McKinney |
| 2,468,101 | A | 4/1949 | Nampa |
| 2,697,631 | A | 12/1954 | Miller |
| 2,752,864 | A | 7/1956 | McDougal, Sr. et al. |
| 2,766,704 | A | 10/1956 | McMahon |
| 2,845,245 | A | 5/1958 | Gray et al. |
| 2,912,939 | A | 11/1959 | Miner, Jr. et al. |
| 2,980,037 | A | 4/1961 | Elsner |
| 2,993,708 | A | 7/1961 | Holman, Jr. |
| 3,177,007 | A | 4/1965 | Oren |
| 3,344,750 | A | 10/1967 | Kostrewa |
| 3,559,591 | A | 2/1971 | Breen et al. |
| 3,590,746 | A | 7/1971 | Gibson |
| 3,712,663 | A | 1/1973 | Laven |
| D232,821 | S | 9/1974 | Fry |

(Continued)

FOREIGN PATENT DOCUMENTS

GB 1209255 10/1970

OTHER PUBLICATIONS

"Complete Installation Guide for the International Strap . . . The One-Way Solution for Securing Lightweight, Regular—or Irregular—shaped Loads in International Shipping Containers", Logistick, Innovators of Freight Securement Systems 2 pages.
Logistick Disposable Cargo Strap Advertisement (2000).

Primary Examiner — Stephen Gordon
(74) Attorney, Agent, or Firm — Barnes & Thornburg LLP

(57) ABSTRACT

An I-shaped cargo restraint device for an intermodal shipping container having an internal wall with corrugations comprising: a central member having a pair of ends; a first wing associated with one of the ends for securing to one of the corrugations; a second wing associated with the other of the ends extending parallel to the first wing, the second wing being spaced apart from the first wing by about 5⅜ inches for securing to an other corrugation adjacent to said one corrugation; and a handle associated with the second wing. The cargo restraint device includes a top surface and a plurality of strengthening ribs disposed thereon. The cargo restraint device including a strengthening lip disposed on the top surface extending around a perimeter of the cargo restraint device. A method of restraining cargo in an intermodal shipping container having internal corrugated walls.

19 Claims, 4 Drawing Sheets

(56) References Cited

U.S. PATENT DOCUMENTS

| | | |
|---|---|---|
| 3,836,174 A | 9/1974 | Holman, Jr. |
| 3,995,565 A | 12/1976 | Kersey |
| 4,026,508 A | 5/1977 | Ziegler |
| 4,080,906 A | 3/1978 | Brown |
| D248,228 S | 6/1978 | Robertson |
| 4,264,251 A | 4/1981 | Blatt |
| 4,278,376 A | 7/1981 | Hunter |
| 2,124,082 A | 7/1983 | Reifer |
| 4,396,325 A | 8/1983 | Joice-Cavanagh |
| 4,432,678 A | 2/1984 | Liebel |
| 4,498,824 A | 2/1985 | Kinkle |
| 4,616,757 A | 10/1986 | Hobson |
| 4,700,918 A | 10/1987 | Andrasko, Jr. |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| 4,982,922 A | 1/1991 | Krause |
| 5,028,184 A | 7/1991 | Krause |
| 5,156,110 A | 10/1992 | Fuller |
| 5,219,251 A | 6/1993 | Kanczuzewski |
| 5,259,712 A | 11/1993 | Wayne |
| 5,281,063 A | 1/1994 | Austin, III |
| 5,320,464 A | 6/1994 | Long et al. |
| 5,326,204 A | 7/1994 | Carlson et al. |
| 5,370,482 A | 12/1994 | Long |
| 5,494,389 A | 2/1996 | Kanczuzewski |
| 5,688,087 A | 11/1997 | Stapleton et al. |
| 5,807,047 A | 9/1998 | Cox |
| 6,086,299 A | 7/2000 | Kanczuzewski |
| D462,310 S | 9/2002 | Kanczuzewski et al. |
| 6,533,513 B2 | 3/2003 | Kanczuzewski et al. |
| D478,857 S * | 8/2003 | Petersen et al. .............. D12/223 |
| 6,874,982 B2 | 4/2005 | Rhodes |
| 7,713,008 B2 * | 5/2010 | Kanczuzewski et al. ....... 410/89 |
| 8,425,166 B2 | 4/2013 | Kanczuzewski et al. |

* cited by examiner

DEVICE AND METHOD FOR RESTRAINING CARGO

The present disclosure relates generally to a device and method for restraining cargo within a container.

BACKGROUND

Cargo transported for commercial and other uses is often shipped in semi-trailers or other shipping containers. One known manner of securing cargo within the shipping container is by securing a pair of cargo restraint devices to opposed internal walls of the container and securing a strap to the cargo restraint devices that extends across the bed of the truck to restrain the cargo. Such cargo restraint devices may not be effective with industry intermodal shipping containers having corrugations spaced apart by 5⅜" inches.

SUMMARY

The present disclosure is directed to a cargo restraint device for an intermodal shipping container having an internal wall with corrugations comprising: a central member having a pair of ends; a first wing associated with one of the ends for securing to one of the corrugations; a second wing associated with the other of the ends extending parallel to the first wing, the second wing being spaced apart from the first wing by about 5⅜ inches for securing to an other corrugation adjacent to said one corrugation; and a handle associated with the second wing defining a hole for receiving a strap. The first and second wings extend parallel to each other and are each generally rectangular and each may have a length of at least about 10 inches and a width of about 3 inches. The central member may be generally rectangular and extend generally perpendicular to the first and second wings. The cargo restraint may further include a top surface and a plurality of strengthening ribs disposed on the top surface. The strengthening ribs include arcuate portions on the wings and linear portions. The cargo restraint device may further include a strengthening lip disposed on the top surface extending around a perimeter of the cargo restraint device.

The present disclosure is also directed to a method of restraining cargo on an intermodal shipping container having internal walls with corrugations spaced apart by about 5⅜ inches comprising: securing a first wing of the cargo restraint member to a first corrugation such that the first wing extends parallel to the first corrugation; securing a second wing of the cargo restraint member to a second corrugation adjacent to the first corrugation such that the second wing extends parallel to the second corrugation and a central member of the cargo restraint device interconnecting the first and second wings extends between the first and second corrugations; and securing a strap to a handle of the cargo restraint device to secure cargo. Securing of the first wing may include securing a bottom surface of the first wing to the first corrugation with an adhesive applied to the bottom surface of the first wing, the bottom surface having a length of about 10 inches and a width of about 3 inches. The cargo restraint device may further include plurality of strengthening ribs and a strengthening lip disposed on a top surface of the cargo restraint device.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
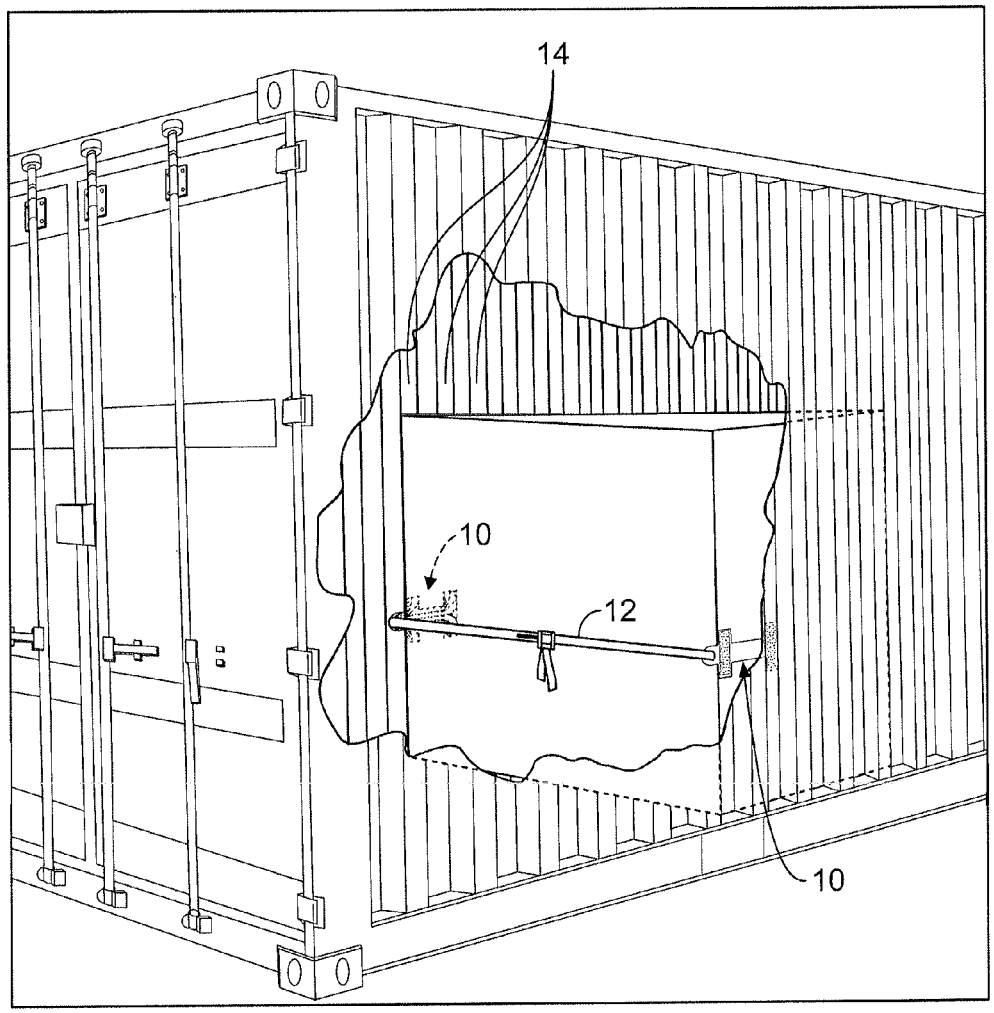
FIG. 1 is a partial view of an intermodal shipping container shown in broken to illustrate a pair of cargo restraint devices in accordance with an illustrated embodiment of the present disclosure and a strap restraining cargo in the intermodal shipping container.
Figure 2:
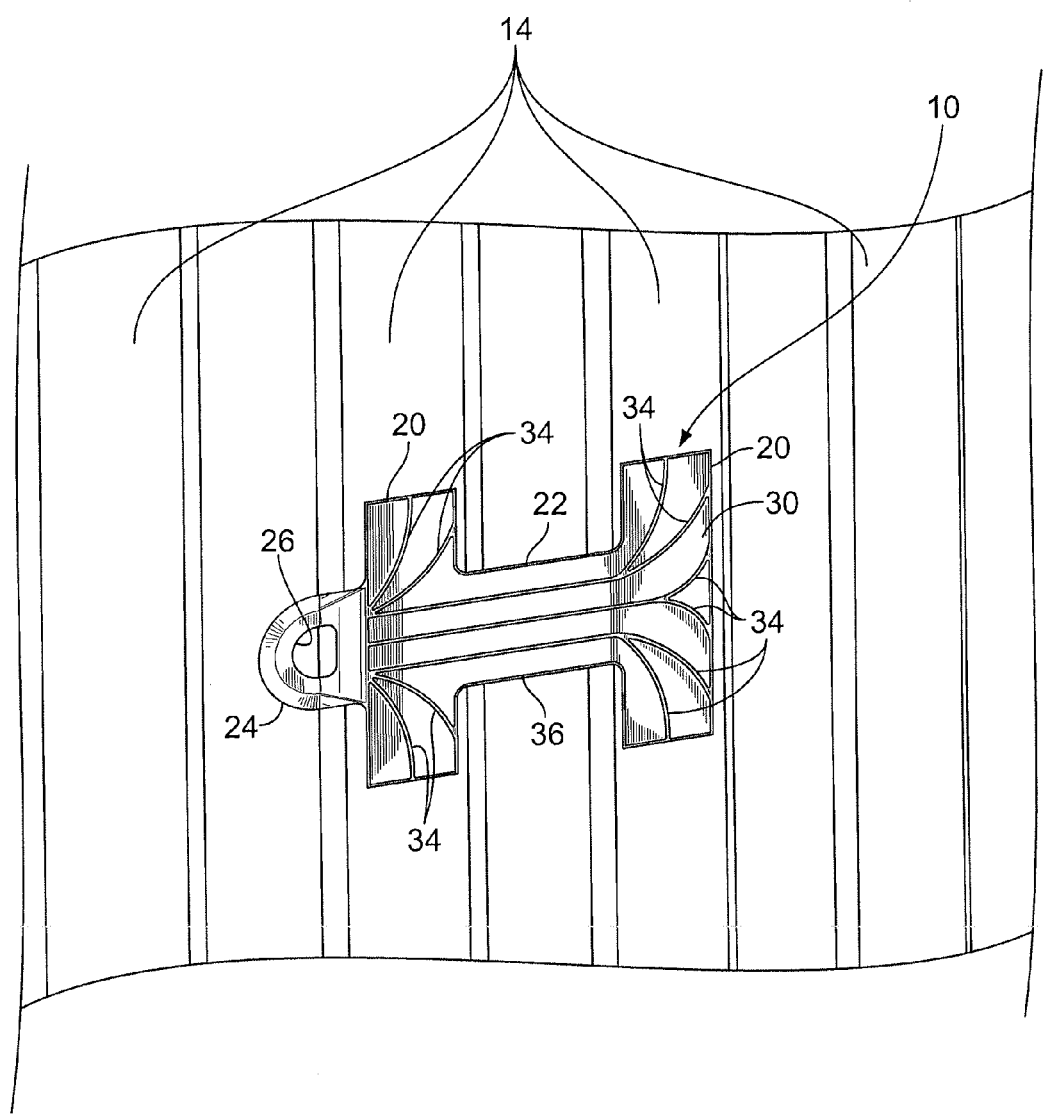
FIG. 2 is a broken view of the intermodal shipping container of FIG. 1 illustrating one of the cargo restraint devices of FIG. 1 secured to the corrugations of the corrugated wall of the intermodal shipping container.
Figure 3:
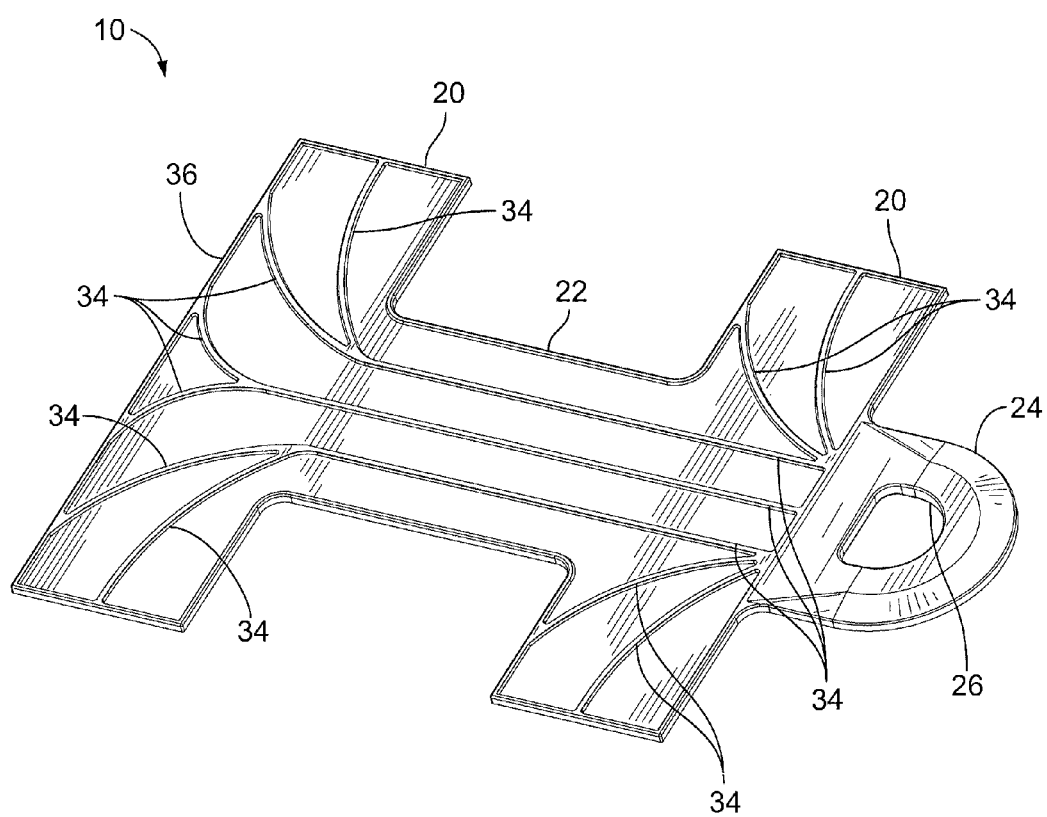
FIG. 3 is a top perspective view of the cargo restraint device of FIG. 2.
Figure 4:
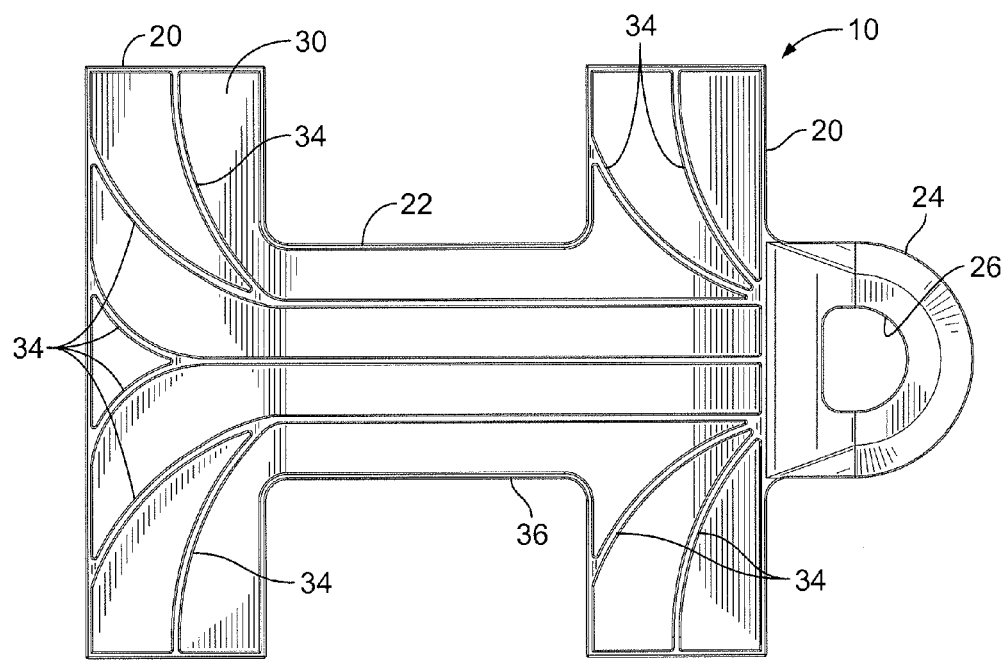
FIG. 4 is a top plan view of the cargo restraint device of FIG. 2.
Figure 5:
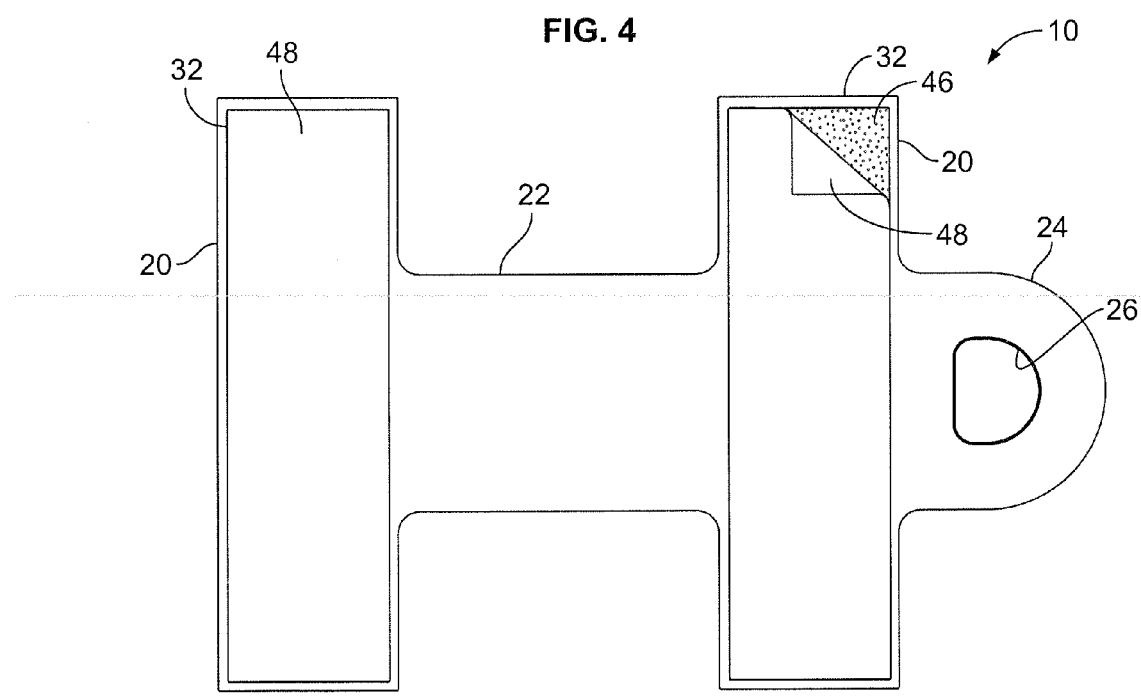
FIG. 5 is a bottom plan view of the cargo restraining device of FIG. 2 before it has been secured to the intermodal container, illustrating adhesive disposed on the bottom surfaces of the wings and removable release liners covering the adhesive.

FIG. 1 illustrates a pair of cargo restraint devices 10 in accordance with an illustrated embodiment of the present disclosure and a strap 12 restraining cargo in an intermodal shipping container having internal walls with corrugations 14. Consistent with the industry, the corrugations 14 of the intermodal shipping container are spaced at intervals of 5⅜ inches and have widths of about 4 inches. With reference to FIGS. 1 and 2, the cargo restraint device 10 are disposed on opposite sides of the internal walls, and each cargo restraint device 10 is secured to a pair of adjacent corrugations 14. The strap 12 interconnects the cargo restraint devices 10 to restrain cargo within the intermodal shipping container.

As illustrated in FIGS. 1-5, the cargo restraint device 10 has an I-shaped configuration and includes a pair of generally rectangular wings 20, a generally rectangular central member 22 interconnecting the wings, and a handle 24. The wings 20 are spaced to accommodate the spacing of corrugations 14 associated with industry intermodal shipping containers and thus are spaced at intervals of about 5⅜ inches. Each of the wings 20 has a width of about 3 inches to engage the corrugations 14 along the entire width of the wings. Thus, the distance between outer sides of the wings 20 are about 11⅜ inches and the distance between the inner sides of the wings are about 5⅜ inches. Each handle 24 defines an aperture 26 for receiving the strap 12.

The illustrated cargo restraint device 10 includes a top surface 30 and a bottom surface 32. The top surface 30 also includes a plurality of strengthening ribs 34 on the top surface 30 to distribute the force of the shifting freight during transport of the intermodal shipping container and to otherwise add to the strength and rigidity of the cargo restraint device 10. The ribs 34 may include portions that extend arcuately on the wings 20 and some of the ribs 34 include portions that extend parallel to the central member 22. In the illustrated embodiment, three of the strengthening ribs 34 extend linearly from the handle 24 on one of the wings 20, across the width of the wing 20, along and parallel to the central member 22, to the other wing 20 and bifurcate to form two arcuate strengthening ribs 34 on the other wing 20. The wing 20 adjacent the handle includes two other arcuate strengthening ribs 34. Additionally, the cargo restraint device 10 includes a strengthening lip 36 extending around its perimeter to provide additional strength and rigidity.

The illustrated cargo restraint device includes an adhesive 46 disposed on the bottom surface 32 of each of the wings 20 for securing the bottom surfaces 32 to the corrugations 14. The adhesive 46 may be in any suitable form. The adhesive 46 may, for example, be in the form of an acrylic based or rubber based adhesive. A removable release liner 48 may also be included. After removal of the release liner 48, the cargo restraint device 10 can be pressed against one of the internal walls of the intermodal shipping container to secure it to the internal wall. The adhesive 46 may be instead disposed directly on the corrugations 14, may be in the form of a two-sided tape with or without removable release liners, or may be in any other suitable form.

The cargo restraint device 10 may have a thickness of about 0.153 inches or any other suitable thickness. Except for the adhesive 46, the cargo restraint device may be constructed of any suitable plastic or other material.

The cargo restraint device 10 in accordance with the illustrated embodiment of the present disclosure provides many benefits. It is an improvement over prior art devices because the cargo restraint device is sized and designed specifically for use in industry intermodal shipping containers. The design of the cargo restraint device 10 including the strengthening ribs 34 and strengthening lip 36 provide support and rigidity for such uses.

The present disclosure also provides a method of restraining cargo on intermodal shipping containers that is not heretofore known. The method of restraining cargo on an industry intermodal shipping container having internal walls with corrugations spaced apart by about 5⅜ inches comprising: securing one the wings 20 of the cargo restraint device 10 to a first corrugation 14 such that the wing extends parallel to the first corrugation; securing the other wing 20 of the cargo restraint member to a second corrugation adjacent to the first corrugation such that the second wing extends parallel to the corrugation and the central member 22 of the cargo restraint device interconnecting the first and second wings extends between the first and second corrugations; and securing the strap 12 to the handle 24 of the cargo restraint device to secure cargo. The securing of the wing 20 includes securing bottoms of the wings with an adhesive 46 applied to bottom surfaces of the wings or in any other suitable manner.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A cargo restraint device for an intermodal shipping container having an internal wall with corrugations comprising:
 a central member having a pair of ends, a top surface and a bottom surface, the top surface and bottom surface lying in closely spaced generally parallel planes;
 a first wing associated with one of the ends for securing to one of the corrugations, the first wing having a top surface, a bottom surface, an inner side and an outer side, the top surface and bottom surface of the first wing lying in the substantially flat closely spaced generally parallel planes;
 a second wing associated with the other of the ends extending parallel to the first wing, the second wing having a top surface, a bottom surface, an inner side and an outer side, the top surface and bottom surface of the second wing lying in the closely spaced generally parallel planes, the second wing length being longer than a spacing between the wings; the second wing inner side being spaced apart from the first wing inner side by about 5⅜ inches for securing to an other corrugation adjacent to said one corrugation;
 adhesive attached to the bottom surface of the first wing; and
 a handle associated with the second wing defining a hole for receiving a strap.

2. The cargo restraint device of claim 1 wherein the first and second wings are each generally rectangular.

3. The cargo restraint device of claim 2 wherein each of the first and second wings has a length of at least about 10 inches.

4. The cargo restraint device of claim 3 wherein each of the first and second wings has a width of about 3 inches.

5. The cargo restraint device of claim 2 wherein the central member is generally rectangular and extends generally perpendicular to the first and second wings.

6. The cargo restraint device of claim 1 further including a plurality of strengthening ribs disposed on the top surface of at least one of the first wing and the second wing.

7. The cargo restraint device of claim 6 wherein the strengthening ribs include arcuate portions on the wings.

8. The cargo restraint device of claim 7 wherein some of the strengthening ribs include portions extending parallel to the central member.

9. The cargo restraint device of claim 6 further including a strengthening lip disposed on the top surface of both the first wing and the second wing and extending around a perimeter of the cargo restraint device.

10. A cargo restraint device for an intermodal shipping container having an internal wall with corrugations, the device comprising:
 a generally rectangular central member having a pair of ends, a top surface and a bottom surface, the top surface and bottom surface lying in closely spaced generally parallel planes;
 a generally rectangular first wing associated with one of the ends, the first wing extending generally perpendicular to the central member, the first wing having a top surface, a bottom surface, an inner side and an outer side, the top surface and bottom surface of the first wing lying in the closely spaced generally parallel planes;
 a generally rectangular second wing associated with the other of the ends for securing to a corrugation, the second wing having a top surface, a bottom surface, an inner side and an outer side, the top surface and bottom surface of the second wing lying in the closely spaced generally parallel planes, the second wing length being longer than a spacing between the wings; the second wing extending generally parallel to the first wing and generally perpendicular to the central member, the second wing inner side spaced from the first wing inner side by about 5⅜ inches;

an adhesive for attaching the first wing to a corrugation; and a handle associated with the second wing defining a hole for receiving a strap.

11. The cargo restraint device of claim 10 wherein each of the first and second wings has a length of at least about 10 inches.

12. The cargo restraint device of claim 10 wherein each of the first and second wings has a width of about 3 inches.

13. The cargo restraint device of claim 10 further including a plurality of strengthening ribs disposed on the top surface of at least one of the first wing and the second wing.

14. The cargo restraint device of claim 13 wherein the strengthening ribs include arcuate portions on the wings and wherein some of the strengthening ribs include portions extending parallel to the central member.

15. The cargo restraint device of claim 13 further including a strengthening lip disposed on the top surface of both the first wing and the second wing and extending around a perimeter of the cargo restraint device.

16. The cargo restraint device of claim 1 further comprising a removable release liner on the adhesive.

17. The cargo restraint device of claim 10 comprising a removable release liner on the adhesive.

18. The cargo restraint device of claim 1 wherein the first wing is adapted for connection to a first corrugation of an intermodal shipping container and the second wing is adapted for connection to a second corrugation of the intermodal shipping container.

19. The cargo restraint device of claim 1 wherein the first wing length being longer than the spacing between the wings.

\* \* \* \* \*